(12) United States Patent
Chan (10) Patent No.: US 8,449,044 B2
(45) Date of Patent: May 28, 2013

(54) BICYCLE RIM

(75) Inventor: Yoke Seng Chan, Negeri Sembilan (MY)

(73) Assignee: Shimano Components (Malaysia) SDN. BHD., Johor (MY)

( * ) Notice: Subject to any disclaimer, the term of this patent is extended or adjusted under 35 U.S.C. 154(b) by 310 days.

(21) Appl. No.: 12/890,748

(22) Filed: Sep. 27, 2010

(65) Prior Publication Data

US 2012/0074763 A1 Mar. 29, 2012

(51) Int. Cl.
*B60B 21/06* (2006.01)

(52) U.S. Cl.
USPC .................................................. 301/95.104

(58) Field of Classification Search
USPC ............... 301/55, 57, 58, 95.101, 95.104, 99
See application file for complete search history.

(56) References Cited

U.S. PATENT DOCUMENTS

| | | | |
|---|---|---|---|
| 538,734 A * | 5/1895 | Laube | 301/55 |
| 543,310 A * | 7/1895 | Laube | 301/55 |
| 6,378,953 B2 | 4/2002 | Mercat et al. | |
| 6,402,256 B1 | 6/2002 | Mercat | |
| 7,140,695 B2 | 11/2006 | Passarotto | |
| 8,007,052 B2 * | 8/2011 | Passarotto et al. | 301/5.21 |
| 2008/0048488 A1 * | 2/2008 | Chen | 301/58 |

FOREIGN PATENT DOCUMENTS

| | | | |
|---|---|---|---|
| DE | 4444044 A1 * | 6/1996 | |
| DE | 20 2008 001 617 U1 | 5/2008 | |
| EP | 26514 A1 * | 4/1981 | |
| JP | 62-275801 A | 11/1987 | |
| JP | 2003260901 A * | 9/2003 | |
| JP | 2009255651 A * | 11/2009 | |
| TW | 291899 U | 6/2006 | |
| TW | 200824929 A * | 6/2008 | |

OTHER PUBLICATIONS

Machine translation of DE 4444044 A1.*

* cited by examiner

*Primary Examiner* — Kip T Kotter
(74) *Attorney, Agent, or Firm* — Global IP Counselors (57) ABSTRACT

A bicycle rim is provided with an annular tire mounting part, an annular spoke mounting part and a pair of side walls. The annular tire mounting part includes an outer bridge. The annular spoke mounting part includes a plurality of spoke openings disposed at predetermined intervals along a circumferential direction of the annular spoke mounting part. The annular spoke mounting part further includes at least one recess disposed in an area between two adjacent ones of the spoke openings. The at least one recess extends less than half of a circumferential distance between the two adjacent ones of the spoke openings. The side walls extend radially from the annular spoke mounting and the outer bridge to define an annular interior space. The outer bridge includes a through hole that at least partially aligns with the at least one recess as viewed in a radial direction of the bicycle rim.

10 Claims, 10 Drawing Sheets

ID BICYCLE RIM

BACKGROUND

1. Field of the Invention

The present invention generally relates to a bicycle rim. More specifically, the present invention relates to a bicycle rim that is coupled to a hub by a plurality of tensioned spokes.

2. Background Information

Bicycle wheels are continually undergoing design modifications to make them easier to manufacture and assemble, as well as stronger, lighter and more aerodynamic. Various types of bicycle wheels are being sold on the market at present. Many bicycle wheels include a hub, multiple spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire.

In general, the spokes of a bicycle wheel are thin wire spokes. A flange that connects the spokes to the hub is normally formed at both ends of the hub. Specifically, holes are formed in the hub flanges. The inner ends of the wire spokes are normally bent, and a toe-shaped flange is formed in the area of such ends. The interior end of each spoke is supported in a hole formed in one hub flange. In general, the outer end of each spoke is threaded such that the outer end can engage with a spoke nipple that secures the outer end of the wire spoke to the rim hole. In order to make the bicycle wheel as lightweight as possible, the rim is usually made of aluminum alloy, and is sought to be made as thin as possible. However, making the rim thin results in a reduction in strength, particularly in the relatively high-stress areas around each spoke hole.

SUMMARY

One aspect of this present disclosure is to provide a bicycle rim that is relatively lightweight.

In view of the state of the known technology, a bicycle rim is provided that basically comprises an annular tire mounting part, an annular spoke mounting part and a pair of side walls. The annular tire mounting part includes an outer bridge. The annular spoke mounting part includes a plurality of spoke openings disposed at predetermined intervals along a circumferential direction of the annular spoke mounting part. The annular spoke mounting part further includes at least one recess disposed in an area between two adjacent ones of the spoke openings. The at least one recess extends less than half of a circumferential distance between the two adjacent ones of the spoke openings. The side walls extend radially from the annular spoke mounting and the outer bridge to define an annular interior space. The outer bridge includes a through hole that at least partially aligns with the at least one recess as viewed in a radial direction of the bicycle rim.

These and other objects, features, aspects and advantages of the bicycle rim present disclosure will become apparent to those skilled in the art from the following detailed description, which, taken in conjunction with the annexed drawings, discloses one illustrated embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
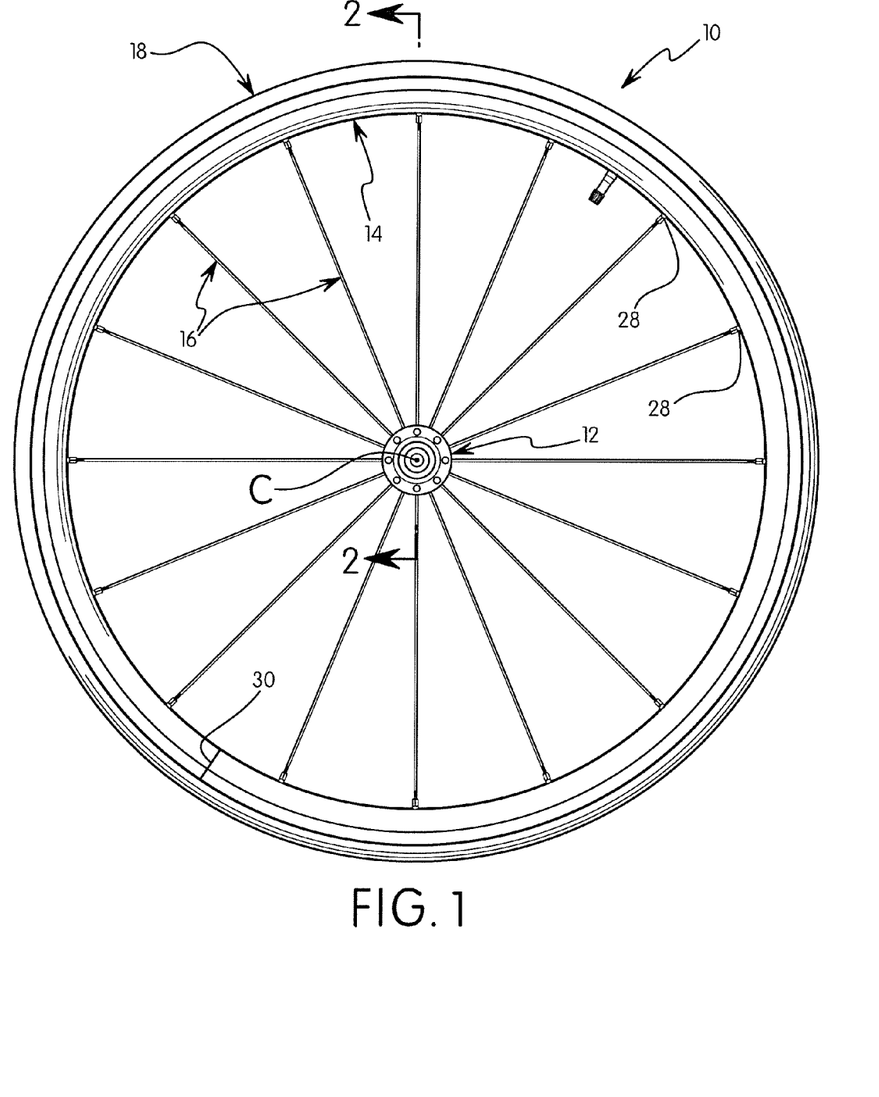
FIG. 1 is a side elevational view of a bicycle wheel that includes a bicycle rim in accordance with one illustrated embodiment.
Figure 2:
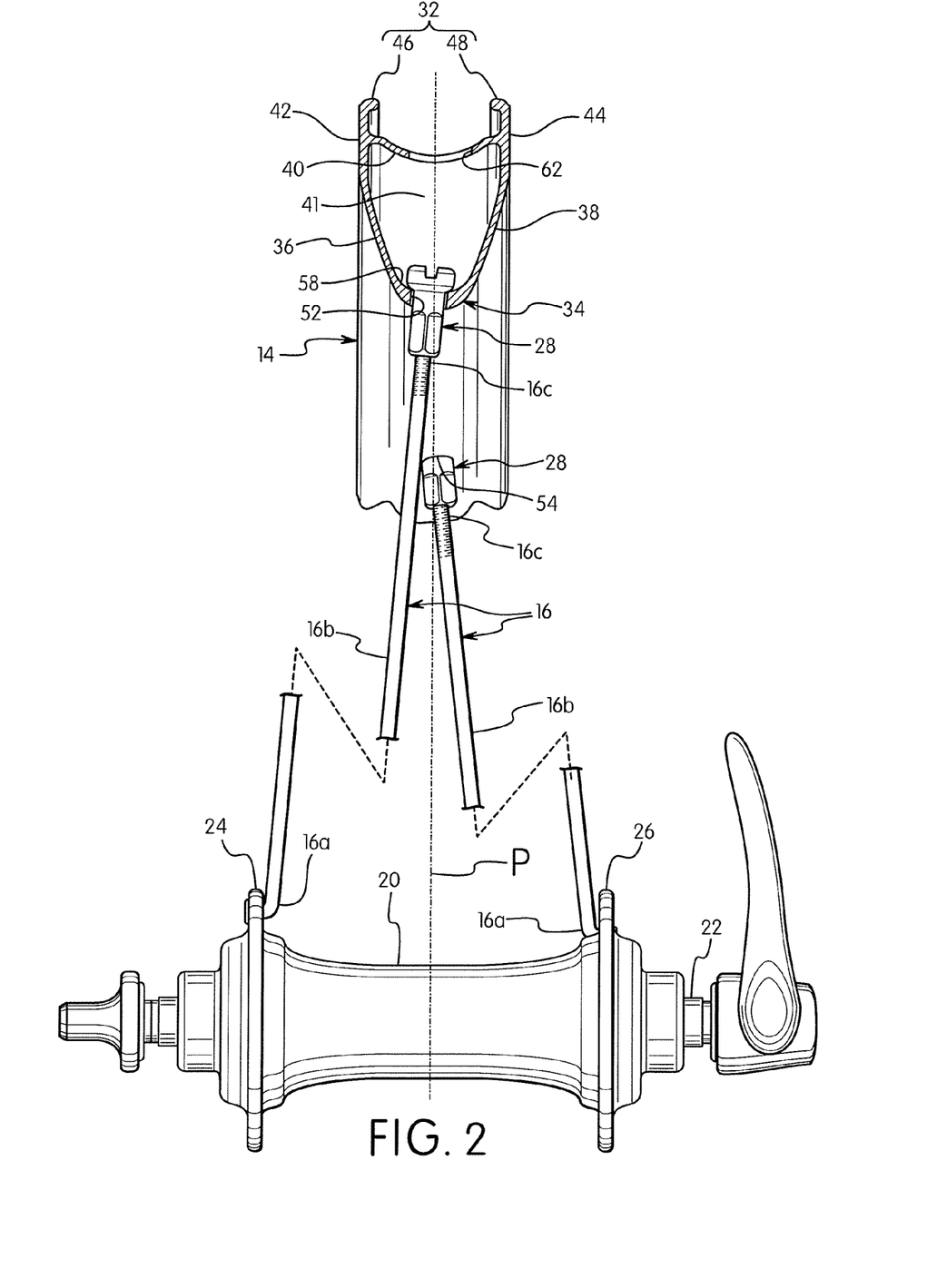
FIG. 2 is an enlarged cross sectional view of a portion of the front wheel illustrated in FIG. 1 as seen along section line 2-2 in FIG. 1.

Referring initially to FIGS. 1 and 2, a bicycle wheel 10 is illustrated in accordance with one illustrated embodiment. The bicycle wheel 10 basically includes a center hub 12, a bicycle rim 14, a plurality of spokes 16 and a pneumatic tire 18. The hub 12 connected to the rim 14 by the spokes 16, which are placed under tension. The tire 18 is attached to the outer periphery of the rim 14. The hub 12, the spokes 16 and the tire 18 are conventional parts, and thus, the hub 12, the spokes 16 and the tire 18 will only be briefly explained herein.

Still referring to FIGS. 1 and 2, the hub 12 will now be briefly explained. The hub 12 is a relatively conventional hub, which basically includes a cylindrical hub shell 20 rotatably supported on a hub axle 22 by a pair of bearings (not shown). The hub axle 22 defines a center axis C of the bicycle wheel 10 and the rim 14. As seen in FIG. 2, the hub 12 has two spoke attachment flanges 24 and 26 for attaching the spokes 16. In particular, each of the attachment flanges 24 and 26 has eight spoke mounting holes for attaching the spokes 16. In the embodiment illustrated, the attachment flanges 24 and 26 are mirror images of each other, but with their spoke mounting holes offset. In other words, the spoke mounting holes of the attachment flange 24 is offset in the circumferential direction from the spoke mounting holes of the attachment flange 26 such that the spokes 16 are disposed at equal intervals about the hub shell 20. In the embodiment illustrated, the hub 12 is a front bicycle hub. However, it will be apparent to those skilled in the bicycle field from this disclosure that the hub 12 can be replaced with a rear hub, as needed and/or desired.

The spokes 16 will now be explained with reference to FIGS. 1 and 2. The spokes 16 are all preferably identical to each other. The spokes 16 are preferably integrally formed as a one-piece, unitary single member (integral member) using conventional manufacturing techniques. In the embodiment illustrated, the spokes 16 are radial spokes that connect the hub 12 to the rim 14. The spokes 16 are aligned along a circumferential direction at equal intervals along the rim 14. Each spoke 16 basically includes an inner end 16a, an elongated center part 16b and an outer end 16c. Each of the outer ends 16c of the spokes 16 has a thread for threadedly receiving a spoke nipple 28.

In the embodiment illustrated, a total of sixteen radial spokes 16 are used. Naturally, it will be apparent to those skilled in the bicycle field from this disclosure that the bicycle wheel 10 can have fewer or more spokes and/or a different spoking arrangement (for example, such as that in which all spokes are tangential spokes, or in which some spokes are tangential spokes and some are radial spokes).

Referring now to FIGS. 3 to 9, the bicycle rim 14 will now be explained in more detail. The rim 14 is essentially a circular metal member that is attached to the outer ends 16c of the spokes 16 by the spoke nipples 28 in a conventional manner. The tire 18 is attached to the outer periphery of the rim 14 in a conventional manner. The rim 14 is a metal rim formed of a suitable metallic material such as an aluminum alloy. For example, the rim 14 can be formed by extruding metal is into a metal tube with a desired cross sectional profile suitable for the rim 14. The metal tube is then cut to the desired length and bent into a hoop member. Then the first and second ends of the hoop member are joined together to define a rim joint part 30.

Figure 3:
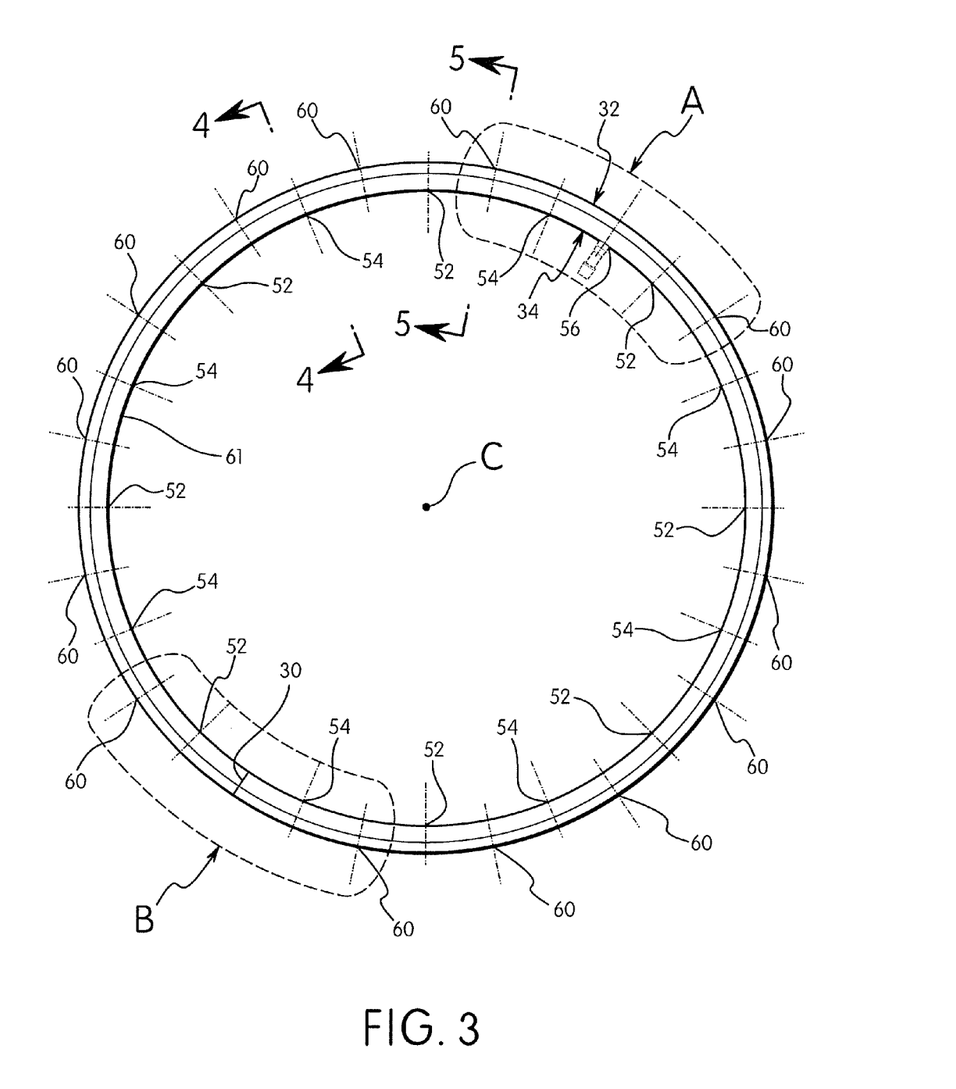
FIG. 3 is a side elevational view of the bicycle rim of the wheel illustrated in FIG. 1, with the tire and spokes removed for the purpose of illustration.
Figure 4:
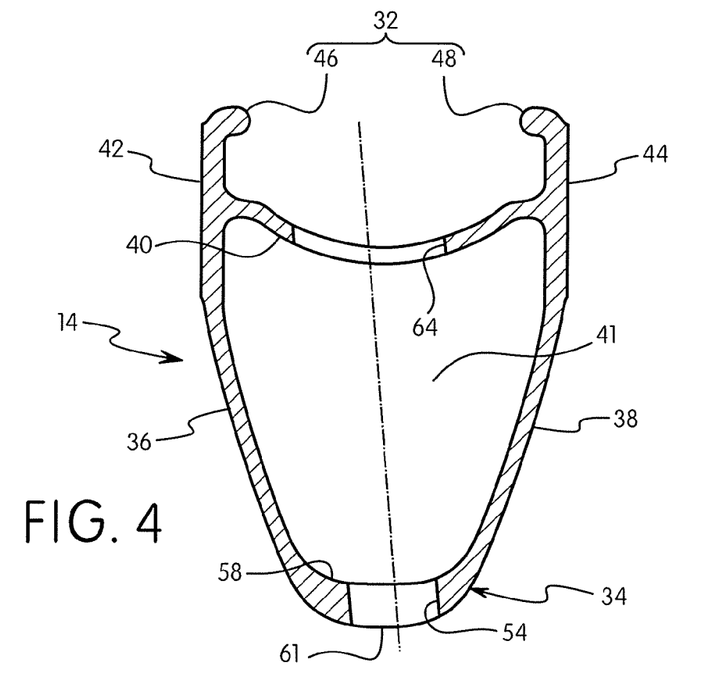
FIG. 4 is an enlarged cross-sectional view of a portion of the bicycle rim illustrated in FIGS. 1 to 3, as seen along section line 4-4 in FIG. 3.
Figure 5:
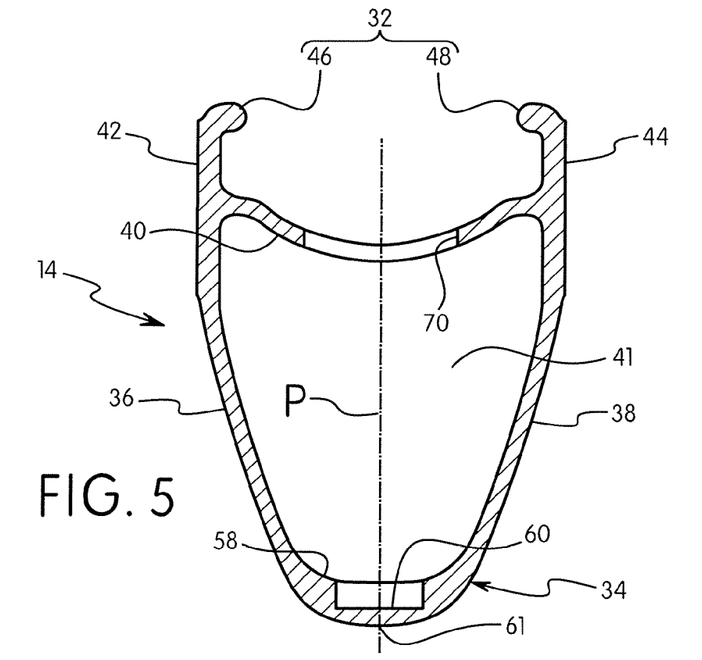
FIG. 5 is an enlarged cross-sectional view of a portion of the bicycle rim illustrated in FIGS. 1 to 3, as seen along section line 5-5 in FIG. 3.
Figure 6:
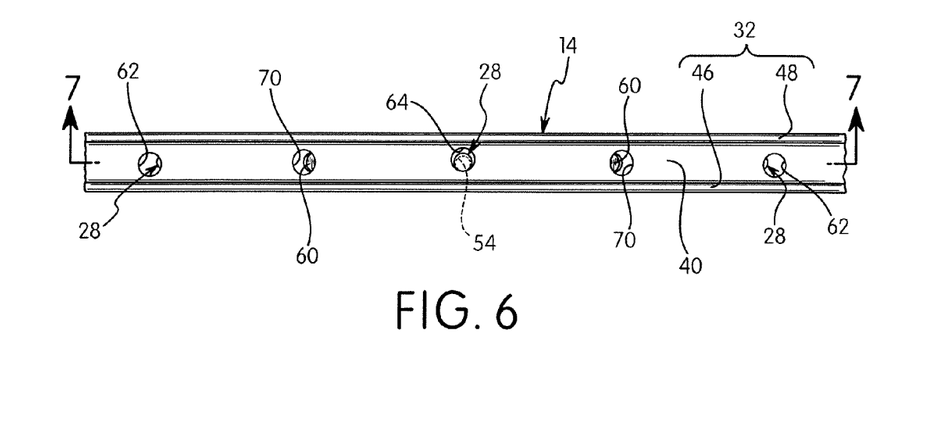
FIG. 6 is a top plan view of a portion of the bicycle rim illustrated in FIGS. 1 to 3 showing three of the sixteen spoke openings and two of the fourteen recesses.
Figure 7:
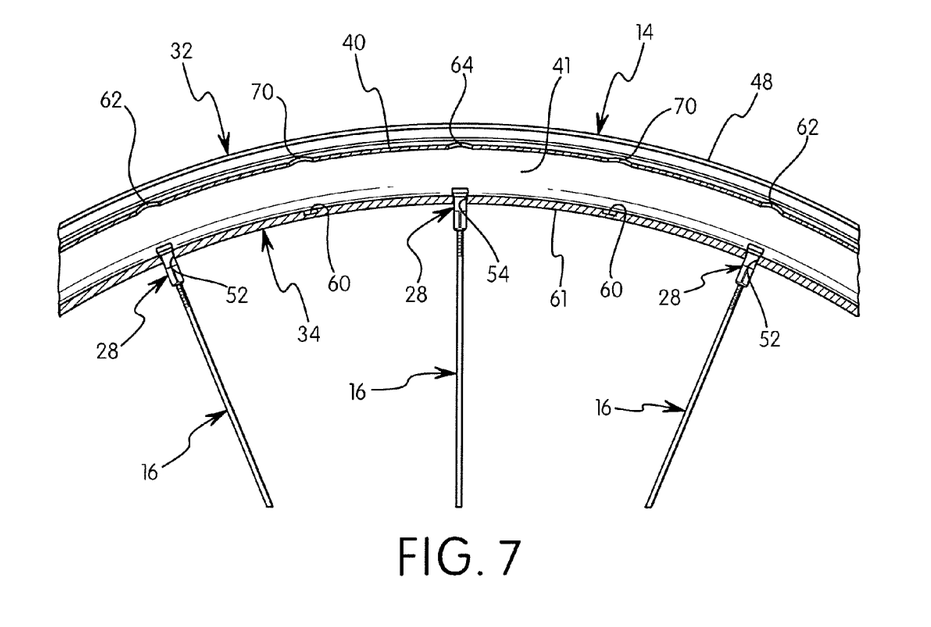
FIG. 7 is a cross-sectional view of a portion of the bicycle rim illustrated in FIG. 6, as seen along section line 7-7 in FIG. 6.

As seen in FIG. 3, the rim 14 basically includes an annular tire mounting part 32 and an annular spoke mounting part 34. As seen in FIG. 4, the annular tire mounting part 32 and the annular spoke mounting part 34 are connected together by a pair of side walls 36 and 38. The side walls 36 and 38 extend in a radial direction from the annular spoke mounting part 34 to an outer bridge 40 of the annular tire mounting part 32. The outer bridge 40 extends between the side walls 36 and 38 such that an annular interior space 41 is defined by the annular spoke mounting part 34, the side walls 36 and 38 and the outer bridge 40.

The rim 14 further includes a pair of flat brake contact surfaces 42 and 44. The brake contact surfaces 42 and 44 are disposed both inward and outward of the outer bridge 40 (i.e., extending across the outer bridge 40 in a radial direction with respect to the center axis C of the rim 14. The annular tire mounting part 32, the annular spoke mounting part 34, the side walls 36 and 38 and the outer bridge 40 are integrally formed as a one-piece, unitary hoop member.

The brake contact surfaces 42 and 44 are typically formed by grinding the sides of the rim 14 after butt welding the ends of the rim 14 together to form a hoop. The grinding of the sides of the rim 14 after butt welding the ends of the rim 14 together to form the brake contact surfaces 42 and 44 is beneficial in that any roughness due to the butt welding procedure can be removed from the brake contact surfaces 42 and 44.

In the illustrated embodiment, the annular tire mounting part 32 is a clincher rim that has a clincher tire engagement structure with a pair of bead hooks or bead flanges 46 and 48 for retaining the tire 18. Thus, in the illustrated embodiment, the tire 18 is a clincher tire (also called a wired-on tire) with a tube (not shown) disposed in the tire 18. The tire 18 has a pair of wire or aramid (Kevlar) fiber beads that interlock with bead flanges 46 and 48 of the annular tire mounting part 32 of the rim 14. Alternatively, if needed and/or desired, the rim 14 can be a tubular or sew-up rim with the outer bridge 40 being configured with a seal (not shown) to provided an air tight outer bridge. In the case of the rim 14 being configured as a tubular or sew-up rim, the tire 18 would be replaced with a tubular or tubeless tire that is held on the rim by cement. In the case of the rim 14 being configured as a tubular or sew-up rim, the brake contact surfaces 42 and 44 would be disposed on the side walls 36 and 38 at a location inward of the end edges of the outer bridge in a radial direction with respect to the center axis C of the rim 14.

In the illustrated embodiment, the annular spoke mounting part 34 has a maximum wall thickness of about 2.5 millimeters as measured in a radial direction with respect to the center axis C of the rim 14. The maximum wall thickness of the annular spoke mounting part 34 is located on a center plane P of the rim 14. The center plane P of the rim 14 extends perpendicularly from the center axis C of the bicycle wheel 10 and bisects the rim 14 into two halves. The thickness of the annular spoke mounting part 34 tapers to a smaller dimension as the annular spoke mounting part 34 approaches the side walls 36 and 38 from the center plane P of the rim 14. The wall thickness of the side walls 36 and 38 is about 0.9 millimeter along a majority of the side walls 36 and 38. However, the side walls 36 and 38 become thicker at the brake contact surfaces 42 and 44. The wall thickness of the side walls 36 and 38 has a wall thickness of 1.3 millimeter along the brake contact surfaces 42 and 44. The outer bridge 40 has a wall thickness of about 0.9 millimeter.

In the embodiment illustrated, the annular spoke mounting part 34 includes a plurality of spoke openings 52 and 54 and a tire air valve hole 56. Also, the annular spoke mounting part 34 has an interior surface 58 that includes a plurality of recesses 60. The recesses 60 reduce the weigh of the bicycle rim 14 without increasing air resistance. In other words, by creating the recesses 60 on the interior surface 58 of the bicycle rim 14 air resistance is not increased. If exterior recesses were formed on an exterior surface of the bicycle rim 14 at the innermost surface of the rim 14, then such exterior recesses would increase air resistance of the rim 14. The recesses 60 extend less than half of a circumferential distance between the two adjacent ones of the spoke openings 52 and 54. In the embodiment illustrated, the recesses 60 are cylindrical blind bores. All of the recesses 60 do not need to be identical as in the illustrated embodiment. In other embodiments, the recesses 60 can have one or more other tubular shapes including, but not limited to, a polygon tube, a triangle tube, a rectangular tube and/or a square tube, etc.

The recesses 60 are disposed in an area between two adjacent ones of the spoke openings 52 and 54, except for the areas between two adjacent ones of the spoke openings 52 and 54 where the rim joint part 30 is formed and where the tire air valve hole 56 is formed. In other words, the spoke openings 52 and 54 and the recesses 60 alternate with respect to each other in a circumferential direction of the rim 14, except for the two areas between two adjacent ones of the spoke openings 52 and 54 where the rim joint part 30 and the tire air valve hole 56 are formed. Since the recesses 60 are formed on the interior surface 58, the weight of the rim 14 can be easily reduced without increasing air resistance. Also by forming the recesses 60 on the interior surface 58, an innermost surface 61 of the annular spoke mounting part 34 has a level curvature, which means that the innermost surface 61 is only a concave surface, with respect to the center axis C of the rim 14, that is free of any abrupt surface changes. Since openings and holes (e.g., the spoke openings 52 and 54 and the tire air valve hole 56) extending completely through the annular spoke mounting part 34, openings and holes are not surfaces that change the level curvature of the innermost surface 61. In other words, as used herein, the term "level curvature" refers to a curvature of a surface, excluding that openings and holes, which does not change from a concave surface to a convex surface or vice-a-versa.

In the embodiment illustrated, there are sixteen of the spoke openings 52 and 54 and fourteen of the recesses 60. While the embodiment illustrated basically shows a total number of the recesses 60 equally two less than a total number of the spoke openings 52 and 54, other configurations as possible without departing from the scope of this disclosure. For example, a single recess could be used, or a total number of recesses 60 could be equal to or greater in number than one-quarter of a total number of the spoke openings 52 and 54. Alternatively, the total number of recesses 60 could be equal to or greater in number than one-third of a total number of the spoke openings 52 and 54, or equal to or greater in number than one-half of a total number of the spoke openings 52 and 54

In the embodiment illustrated, the spoke openings 52 and 54 are equally spaced apart round the circumference of the annular spoke mounting part 34 such that the centers of the spoke openings 52 and 54 are spaced 22.5 degrees apart about the center axis C. In other words, the spoke openings 52 and 54 are disposed at predetermined intervals along a circumferential direction of the annular spoke mounting part 34. The spoke openings 52 and 54 are disposed along the center plane P of the rim 14. The spoke openings 52 and 54 are angled with respect to the center plane P of the rim 14 by about five to six degrees in an alternating manner. In other words, the spoke openings 52 have their center axes tilted to a first side of the center plane P, and the spoke openings 54 have their center axes tilted to a second side of the center plane P. The spoke openings 52 (tilted to the first side) alternate with the spoke openings 54 (tilted to the second side). In the embodiment illustrated, the spoke openings 52 and 54 are circular openings with a diameter (maximum width) of about five millimeters for receiving the spoke nipple 28. However, the spoke openings 52 and 54 can be sized such that each of the spoke openings 52 and 54 receives a reinforcement as needed and/or desired. Also the reinforcements can be a threaded type reinforcement or a non-threaded type reinforcement (e.g., an eyelet) as needed and/or desired.

Figure 8:
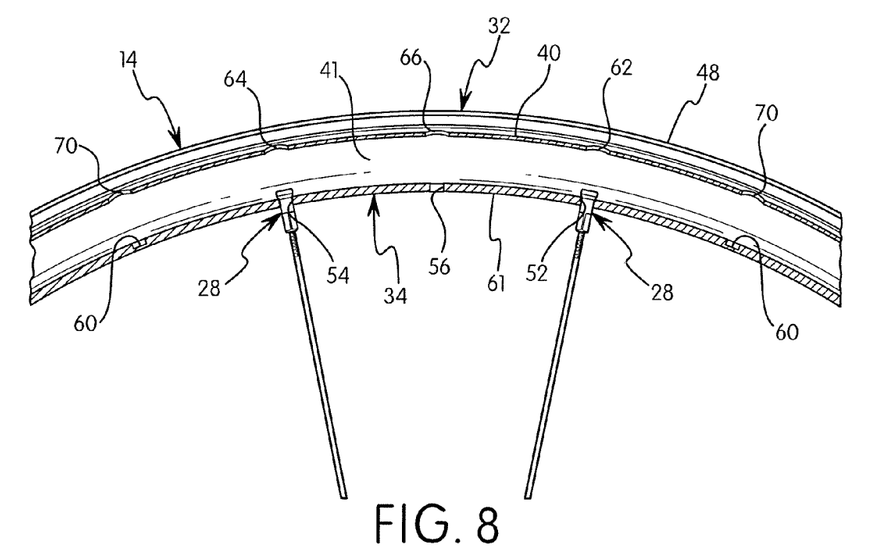
FIG. 8 is a cross-sectional view of another portion of the bicycle rim illustrated in FIGS. 1 to 3 that corresponds to the encircled portion A in FIG. 3 (i.e., a cross-sectional view cut along a symmetry plane of the bicycle wheel)
Figure 9:
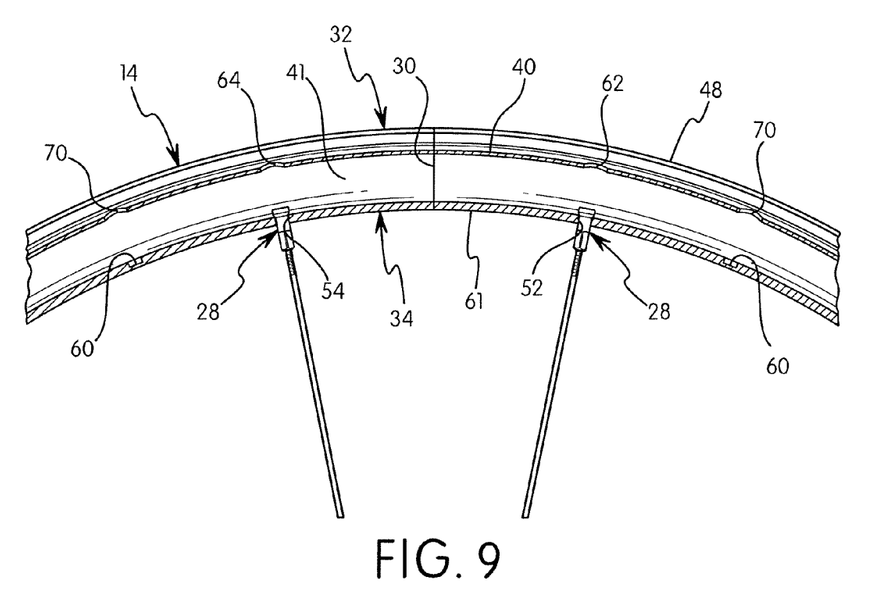
FIG. 9 is a cross-sectional view of another portion of the bicycle rim illustrated in FIGS. 1 to 3 that corresponds to the encircled portion B in FIG. 3 (i.e., a cross-sectional view cut along a symmetry plane of the bicycle wheel)

As seen in FIGS. 3 and 8, the air valve hole 56 is disposed in an area that extends between two adjacent ones of the spoke openings 52 and 54 and that is free of the recesses 60. The air valve hole 56 is disposed midway between the two adjacent ones of the spoke openings 52 and 54 in this illustrated embodiment. The air valve hole 56 is disposed on the center plane P of the rim 14. The air valve hole 56 is a circular opening with a diameter (maximum width) of about six millimeters (e.g., 6.3 mm). Thus, the diameter of the air valve hole 56 is larger than the diameters of the spoke openings 52 and 54.

As seen in FIGS. 3 and 5 to 9, each of the recesses 60 is located near a center position between the two adjacent ones of the spoke openings 52 and 54. As used herein, the center position between the two adjacent ones of the spoke openings 52 and 54 refers to a center position defined with respect to the circumferential direction of the annular spoke mounting part 34. In the illustrated embodiment, the recesses 60 are disposed at a position on the center plane P that corresponds to a symmetry plane of rotation of the rim 14. In the illustrated embodiment, the recesses 60 are each defined by a cylindrical surface with a circular cross sectional profile. The circular cross sectional profiles of the recesses 60 are advantageous in that the recesses 60 are easy to form with a drill or the like. However, the recesses 60 can have other non-circular cross sectional profiles as needed and/or desired.

In the illustrated embodiment, the recesses 60 each have a diameter (maximum width) of about five millimeters and a depth of 1.2 millimeters as measured in a radial direction with respect to the center axis C of the rim 14. Thus, the wall thickness of the annular spoke mounting part 34 is reduced from about 2.5 millimeters to about 1.3 millimeters at the center plane P of the rim 14 in the illustrated embodiment. In other words, the wall thickness of the annular spoke mounting part 34 at each of the recesses 60 is half of the wall thickness of the annular spoke mounting part 34 that surrounds the spoke openings 52 and 54 and the air valve hole 56.

For a rim with an innermost diameter of about 572.75 millimeters as shown, the circumferential distance between the center axes of the spoke openings 52 and 54 is about 112.4 millimeters. Thus, the diameter (maximum width) of the recesses 60 in the circumferential direction of the annular spoke mounting part 34 is less than five percent of the distance of the area extending between the two adjacent ones of the spoke openings 52 and 54. However, the maximum widths of the recesses 60 in the circumferential direction of the annular spoke mounting part 34 can be larger. For example, each of the recesses 60 has a maximum circumferential width that is extend less than half of a circumferential distance between two adjacent ones of the openings 52 and 54. Alternatively, each of the recesses 60 has a maximum circumferential width that is extend less than one-quarter of a circumferential distance between two adjacent ones of the openings 52 and 54.

In any event, maximum widths of the recesses 60 in the circumferential direction of the annular spoke mounting part 34 are preferably dimensioned such that a majority of the annular spoke mounting part 34 has a first predetermined dimension in a radial direction of the bicycle rim 14 and the areas including the recesses 60 each have a second predetermined dimension in a radial direction of the bicycle rim that is smaller than the first predetermined dimension. In other words, the maximum widths or diameters of the recesses 60 has a smaller dimension as measured in the circumferential direction of the annular spoke mounting part 34 than half of a distance between two adjacent ones of the spoke openings 52 and 54. Thus, the recesses 60 create localized areas of reduced material that are spaced from spoke openings 52 and 54. If widths of the recesses 60 as measured in the circumferential direction of the annular spoke mounting part 34 are made too large, then the overall strength of the rim 14 would be undesirably reduced.

In the illustrated embodiment, the outer bridge 40 includes a plurality of first through holes 62 and 64 that provide access to the annular interior space 41 for forming the spoke openings 52 and 54. The outer bridge 40 also includes a through hole 66 that provide access to the annular interior space 41 for forming the valve opening 56. Thus, the through holes 62 and 64 are arranged so that the through holes 62 and 64 at least partially align with the spoke openings 52 and 54, respectively, as viewed in a radial direction of the bicycle rim 14 while individually looking into each of the spoke openings 52 and 54. Since there are sixteen of the spoke openings 52 and 54, sixteen of the first through holes 62 and 64 are provided in the outer bridge 40.

The through holes 62 and 64 are angled with respect to the center plane P of the rim 14 by about five to six degrees in an alternating manner. In other words, the through holes 62 have their center axes tilted to the first side of the center plane P, and the through holes 64 have their center axes tilted to the second side of the center plane P. The through holes 62 (tilted to the first side) alternate with the through holes 64 (tilted to the second side). The through holes 62 and 64 are circular openings with a diameter (maximum width) of about eight and one-half millimeters for inserting the spoke nipple 28 therethrough.

The outer bridge 40 also includes a plurality of second through holes 70 that provide access to the annular interior space 41 for forming the recesses 60. Thus, the second through holes 70 are arranged so that the through holes 70 at least partially align with the recesses 60, respectively as viewed in a radial direction of the bicycle rim 14 while individually looking into each of the recesses 60. Since there are fourteen of the recesses 60, fourteen of the second through holes 70 are provided in the outer bridge 40. The second through holes 70 are circular openings with a diameter (maximum width) of about eight and one-half millimeters.

In the first illustrated embodiment, the recesses 60 are made by a mechanical forming operation in which a mechanical forming tool (e.g., a drill) is inserted through the second through holes 70. In accordance with this disclosure, the inner diameters of the spoke openings 52 and 54 and the inner diameters of the blind bores defining the recesses 60 are identical or substantially identical. Alternatively, the inner diameters of the blind bores defining the recesses 60 are larger than the inner diameters of the spoke openings 52 and 54. In the first illustrated embodiment, the inner diameters of first through holes 62 and 64 and the inner diameters of the second through holes 70 are identical or substantially identical. Alternatively, the inner diameters of the second through holes 70 are larger than the inner diameters of first through holes 62 and 64.

Figure 10:
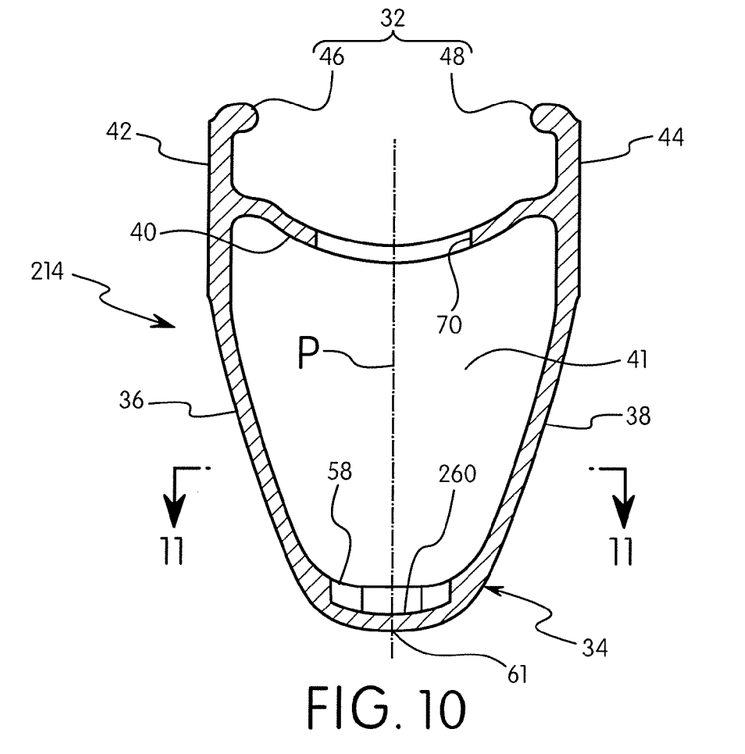
FIG. 10 is an enlarged cross-sectional view, similar to FIG. 5, of a portion of a bicycle rim in accordance with another illustrated embodiment.
Figure 11:
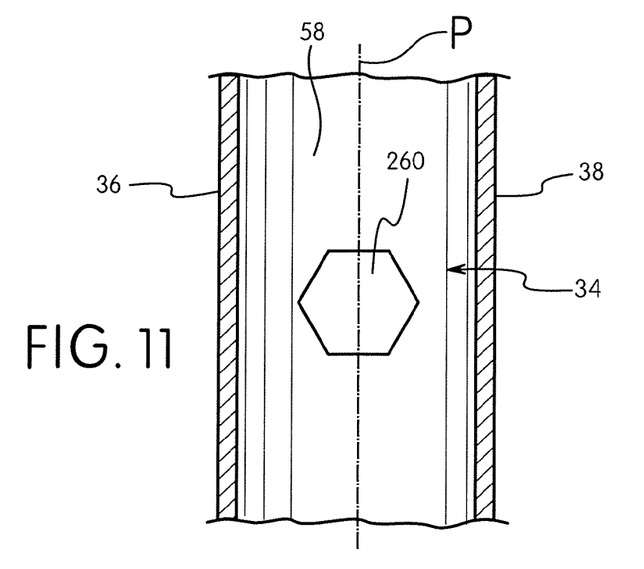
FIG. 11 is a cross-sectional view of a portion of the bicycle rim illustrated in FIG. 10, as seen along section line 11-11 in FIG. 10.

Referring now to FIGS. 10 and 11, an enlarged cross-sectional view of a portion of a bicycle rim 214 is illustrated in accordance with another illustrated embodiment. The bicycle rim 214 is identical to the bicycle rim 14 discussed above, except for the shape of the recesses 60 have been change from a circular blind bore to a polygon tube of recesses 260. Since the only difference between the rims 14 and 214 is the shape of the recesses 260, the bicycle rim 214 will not be discussed in detail herein. Moreover, in this embodiment, the parts of the rim 214 that are identical to the rim 14 of the first embodiment will be given the same reference numerals for the sake of brevity.

Same as the first embodiment, the recesses 260 are disposed in an area between two adjacent ones of the spoke openings 52 and 54, except for the areas between two adjacent ones of the spoke openings 52 and 54 where the rim joint part 30 is formed and where the tire air valve hole 56 is formed. In other words, the spoke openings 52 and 54 and the recesses 260 alternate with respect to each other in a circumferential direction of the rim 214, except for the two areas between two adjacent ones of the spoke openings 52 and 54 where the rim joint part 30 and the tire air valve hole 56 are formed. The bicycle rim 214 can have all identical recesses, or various combinations of differently shaped recesses as needed and/or desired.

Figure 12:
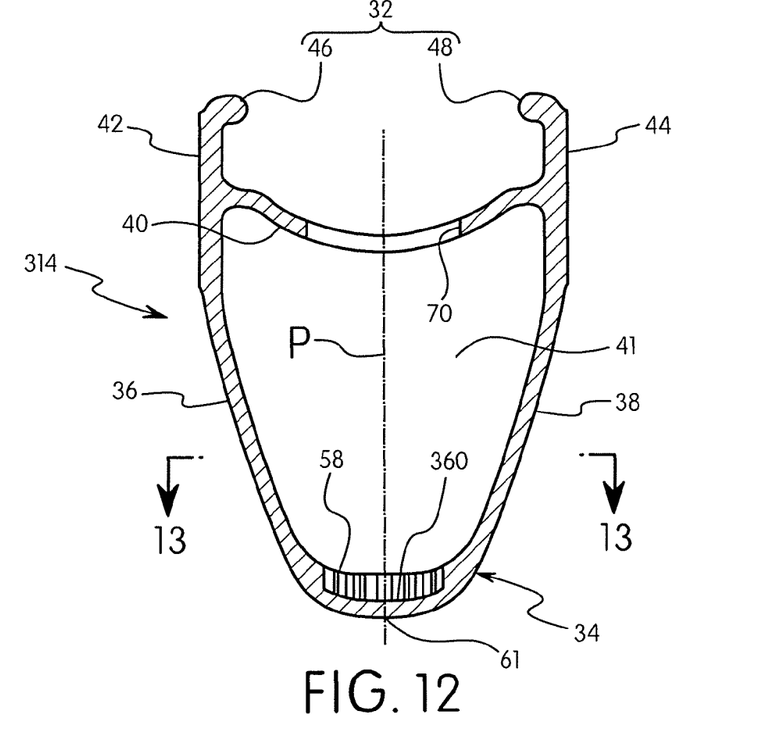
FIG. 12 is an enlarged cross-sectional view, similar to FIG. 5, of a portion of a bicycle rim in accordance with another illustrated embodiment.
Figure 13:
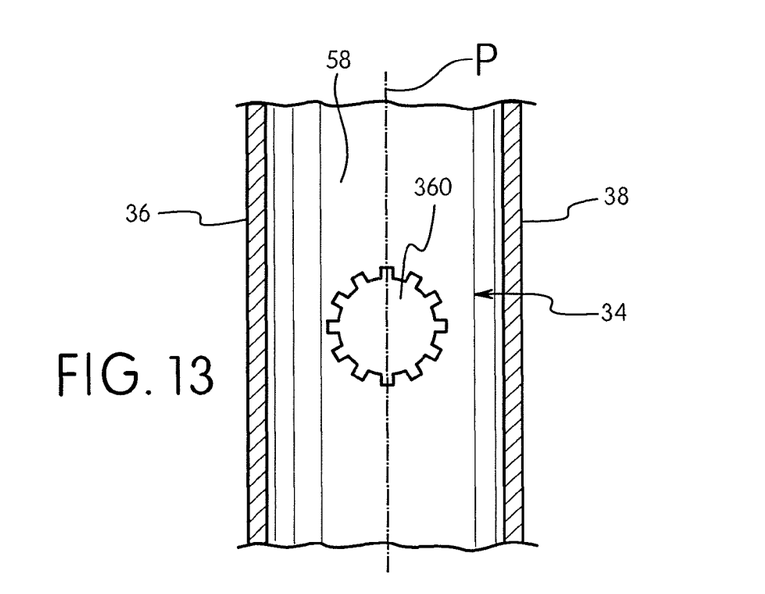
FIG. 13 is a cross-sectional view of a portion of the bicycle rim illustrated in FIG. 12, as seen along section line 13-13 in FIG. 12.

Referring now to FIGS. 12 and 13, an enlarged cross-sectional view of a portion of a bicycle rim 314 is illustrated in accordance with another illustrated embodiment. The bicycle rim 314 is identical to the bicycle rim 14 discussed above, except for the shape of the recesses 60 have been change from a circular blind bore to a splined blind bore of recesses 360. Since the only difference between the rims 14 and 314 is the shape of the recesses 360, the bicycle rim 314 will not be discussed in detail herein. Moreover, in this embodiment, the parts of the rim 314 that are identical to the rim 14 of the first embodiment will be given the same reference numerals for the sake of brevity.

Same as the first embodiment, the recesses 360 are disposed in an area between two adjacent ones of the spoke openings 52 and 54, except for the areas between two adjacent ones of the spoke openings 52 and 54 where the rim joint part 30 is formed and where the tire air valve hole 56 is formed. In other words, the spoke openings 52 and 54 and the recesses 360 alternate with respect to each other in a circumferential direction of the rim 314, except for the two areas between two adjacent ones of the spoke openings 52 and 54 where the rim joint part 30 and the tire air valve hole 56 are formed. The bicycle rim 314 can have all identical recesses, or various combinations of differently shaped recesses as needed and/or desired.

Figure 14:
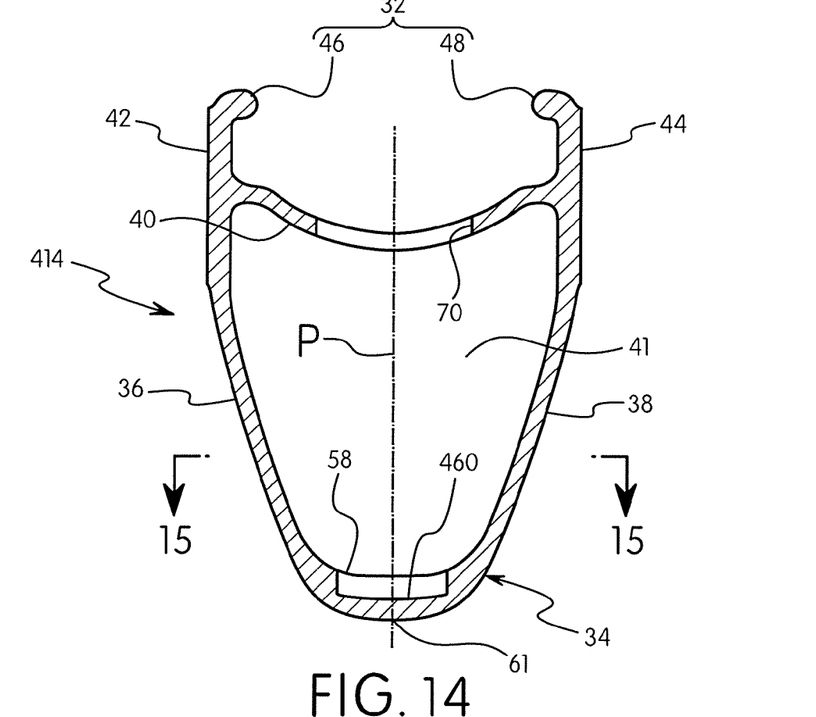
FIG. 14 is an enlarged cross-sectional view, similar to FIG. 5, of a portion of a bicycle rim in accordance with another illustrated embodiment.
Figure 15:
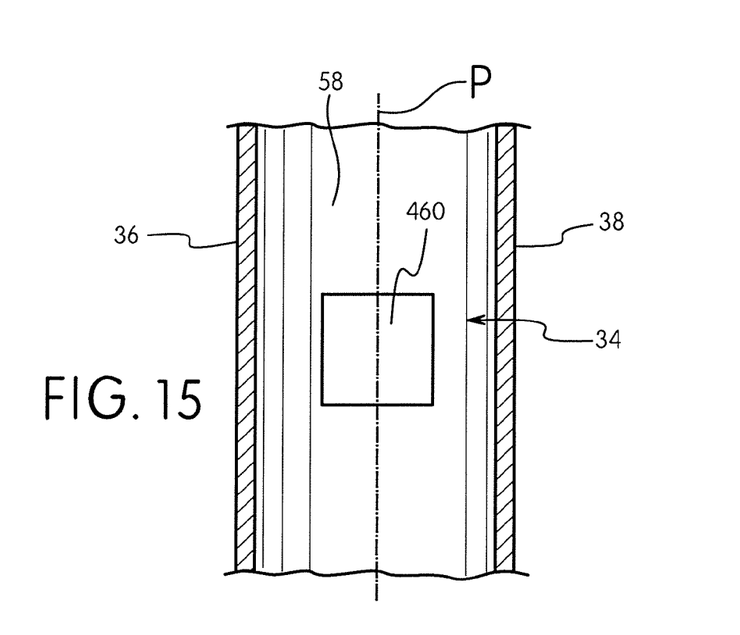
FIG. 15 is a cross-sectional view of a portion of the bicycle rim illustrated in FIG. 14, as seen along section line 15-15 in FIG. 14.

Referring now to FIGS. 14 and 15, an enlarged cross-sectional view of a portion of a bicycle rim 414 is illustrated in accordance with another illustrated embodiment. The bicycle rim 414 is identical to the bicycle rim 14 discussed above, except for the shape of the recesses 60 have been change from a circular blind bore to a square tube of recesses 460. Since the only difference between the rims 14 and 414 is the shape of the recesses 460, the bicycle rim 414 will not be discussed in detail herein. Moreover, in this embodiment, the parts of the rim 414 that are identical to the rim 14 of the first embodiment will be given the same reference numerals for the sake of brevity.

Same as the first embodiment, the recesses 460 are disposed in an area between two adjacent ones of the spoke openings 52 and 54, except for the areas between two adjacent ones of the spoke openings 52 and 54 where the rim joint part 30 is formed and where the tire air valve hole 56 is formed. In other words, the spoke openings 52 and 54 and the recesses 460 alternate with respect to each other in a circumferential direction of the rim 414, except for the two areas between two adjacent ones of the spoke openings 52 and 54 where the rim joint part 30 and the tire air valve hole 56 are formed. The bicycle rim 414 can have all identical recesses, or various combinations of differently shaped recesses as needed and/or desired.

Figure 16:
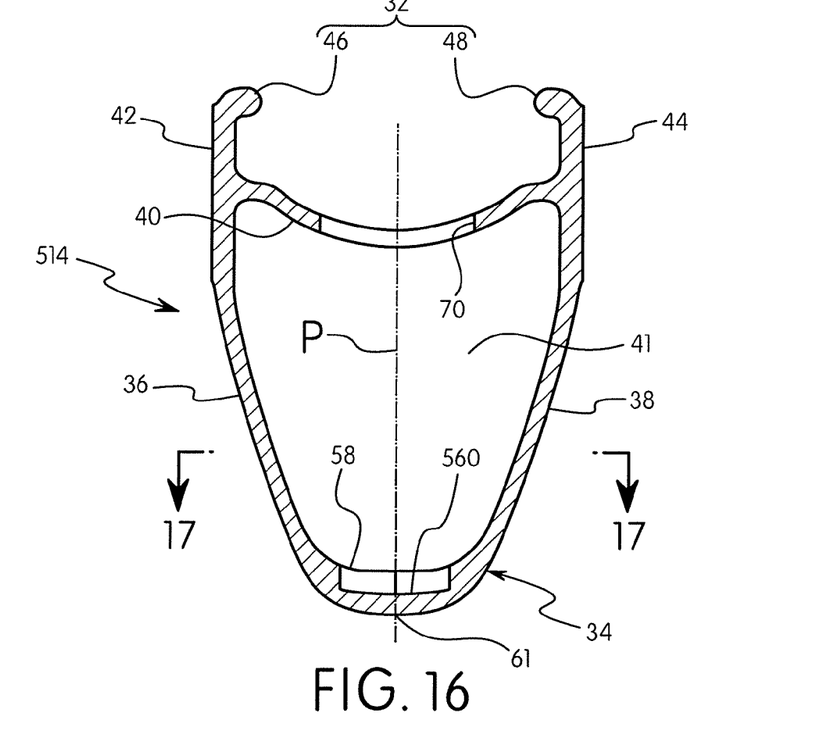
FIG. 16 is an enlarged cross-sectional view, similar to FIG. 5, of a portion of a bicycle rim in accordance with another illustrated embodiment.
Figure 17:
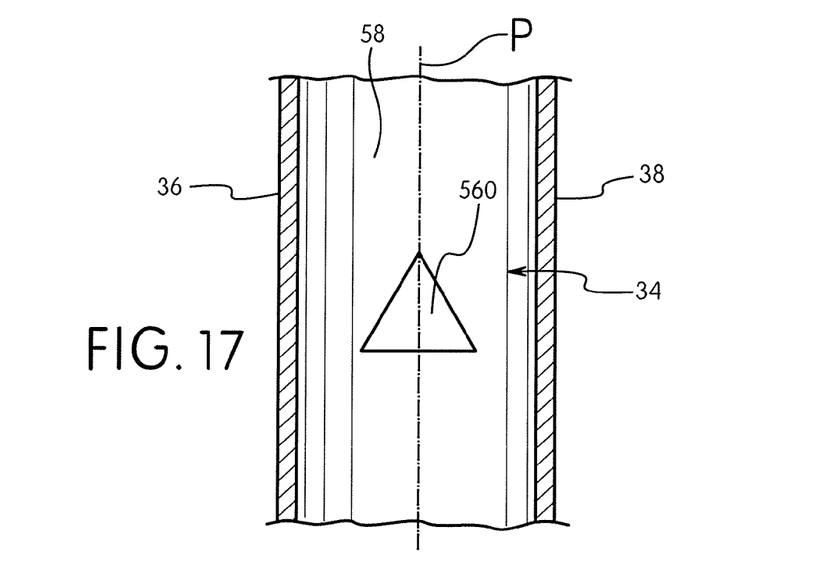
FIG. 17 is a cross-sectional view of a portion of the bicycle rim illustrated in FIG. 16, as seen along section line 17-17 in FIG. 16.

Referring now to FIGS. 16 and 17, an enlarged cross-sectional view of a portion of a bicycle rim 514 is illustrated in accordance with another illustrated embodiment. The bicycle rim 514 is identical to the bicycle rim 14 discussed above, except for the shape of the recesses 60 have been change from a circular blind bore to a triangular tube of recesses 560. Since the only difference between the rims 14 and 514 is the shape of the recesses 560, the bicycle rim 514 will not be discussed in detail herein. Moreover, in this embodiment, the parts of the rim 514 that are identical to the rim 14 of the first embodiment will be given the same reference numerals for the sake of brevity.

Same as the first embodiment, the recesses 560 are disposed in an area between two adjacent ones of the spoke openings 52 and 54, except for the areas between two adjacent ones of the spoke openings 52 and 54 where the rim joint part 30 is formed and where the tire air valve hole 56 is formed. In other words, the spoke openings 52 and 54 and the recesses 560 alternate with respect to each other in a circumferential direction of the rim 514, except for the two areas between two adjacent ones of the spoke openings 52 and 54 where the rim joint part 30 and the tire air valve hole 56 are formed. The bicycle rim 514 can have all identical recesses, or various combinations of differently shaped recesses as needed and/or desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle rim. Accordingly, these terms, as utilized to describe the bicycle rim should be interpreted relative to a bicycle equipped with the bicycle rim as used in the normal riding position on a flat horizontal surface. Finally, terms of degree such as "substantially", "about" and "approximately" as used herein mean a reasonable amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
an annular tire mounting part including an outer bridge;
an annular spoke mounting part including a plurality of spoke openings disposed at predetermined intervals along a circumferential direction of the annular spoke mounting part, the annular spoke mounting part further including at least one recess disposed in an area between two adjacent ones of the spoke openings, the at least one recess extending less than half of a circumferential distance between the two adjacent ones of the spoke openings; and
a pair of side walls extending radially from the annular spoke mounting part and the outer bridge to define an annular interior space, the outer bridge including a through hole that at least partially aligns with the at least one recess as viewed in a radial direction of the bicycle rim, the at least one recess being a blind recess that opens to the annular interior space.

2. The bicycle rim according to claim 1, wherein
the at least one recess is located near a center position between the two adjacent ones of the spoke openings, the center position being defined with respect to the circumferential direction of the annular spoke mounting part.

3. The bicycle rim according to claim 1, wherein
the at least one recess is defined by a cylindrical surface with a circular cross sectional profile.

4. The bicycle rim according to claim 1, wherein
the at least one recess includes a plurality of recesses that is equal to or greater in number than one-half of a total number of the spoke openings, the recesses being disposed in the annular spoke mounting part between adjacent ones of the spoke openings.

5. The bicycle rim according to claim 1, wherein
the annular spoke mounting part has an innermost surface with a level curvature.

6. The bicycle rim according to claim 1, wherein
the at least one recess includes a plurality of recesses, the recesses being disposed in areas of the annular spoke mounting part between each of adjacent ones of the spoke openings, except between adjacent ones of the spoke openings where either a rim joint part or a valve opening exists.

7. The bicycle rim according to claim 1, wherein
the annular spoke mounting part is made from a metal.

8. The bicycle rim according to claim 1, wherein
the at least one recess includes a plurality of recesses that are disposed at positions at least partially lying on a symmetry plane of rotation.

9. A bicycle rim comprising:
an annular tire mounting part including an outer bridge;
an annular spoke mounting part including a plurality of spoke openings disposed at predetermined intervals along a circumferential direction of the annular spoke mounting part, the annular spoke mounting part further including at least one recess disposed in an area between two adjacent ones of the spoke openings, the at least one recess extending less than half of a circumferential distance between the two adjacent ones of the spoke openings,
the annular tire mounting part and the annular spoke mounting part being integrally formed as a one-piece, unitary hoop member, the hoop member having first and second ends joined together to define a rim joint part disposed in an area extending completely between two adjacent ones of the spoke openings that is free of the at least one recess; and
a pair of side walls extending radially from the annular spoke mounting part and the outer bridge to define an annular interior space, the outer bridge including a through hole that at least partially aligns with the at least one recess as viewed in a radial direction of the bicycle rim, the at least one recess being a blind recess that opens to the annular interior space.

10. A bicycle rim comprising:

an annular tire mounting part including an outer bridge;

an annular spoke mounting part including a plurality of spoke openings disposed at predetermined intervals along a circumferential direction of the annular spoke mounting part, the annular spoke mounting part further including at least one recess disposed in an area between two adjacent ones of the spoke openings, the at least one recess extending less than half of a circumferential distance between the two adjacent ones of the spoke openings, the annular spoke mounting part including an air valve hole disposed in an area extending completely between two adjacent ones of the spoke openings that is free of the at least one recess; and a pair of side walls extending radially from the annular spoke mounting part and the outer bridge to define an annular interior space, the outer bridge including a through hole that at least partially aligns with the at least one recess as viewed in a radial direction of the bicycle rim, the at least one recess being a blind recess that opens to the annular interior space.

\* \* \* \* \*